(12) United States Patent
Yanagi et al.

(10) Patent No.: US 11,270,136 B2
(45) Date of Patent: Mar. 8, 2022

(54) DRIVING SUPPORT DEVICE, VEHICLE, INFORMATION PROVIDING DEVICE, DRIVING SUPPORT SYSTEM, AND DRIVING SUPPORT METHOD

(71) Applicant: TOYOTA JIDOSHA KABUSHIKI KAISHA, Toyota (JP)

(72) Inventors: Takuro Yanagi, Toyota (JP); Maki Tamura, Nisshin (JP); Mutsumi Matsuura, Okazaki (JP); Toshihiko Inoue, Toyota (JP); Naoki Yamamuro, Nagoya (JP); Takashi Hayashi, Aichi-gun (JP); Takahiro Shiga, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 105 days.

(21) Appl. No.: 16/676,529

(22) Filed: Nov. 7, 2019

(65) Prior Publication Data

US 2020/0202146 A1 Jun. 25, 2020

(30) Foreign Application Priority Data

Dec. 21, 2018 (JP) .............................. JP2018-240114

(51) Int. Cl.
*G06K 9/00* (2006.01)
*G08G 1/0962* (2006.01)
*B60W 50/14* (2020.01)
*B60R 1/00* (2006.01)

(52) U.S. Cl.
CPC ............ *G06K 9/00818* (2013.01); *B60R 1/00* (2013.01); *B60W 50/14* (2013.01); *G06K 9/00805* (2013.01); *G08G 1/09623* (2013.01); *B60W 2050/146* (2013.01)

(58) Field of Classification Search
None
See application file for complete search history.

(56) References Cited

U.S. PATENT DOCUMENTS

| 10,081,370 | B2* | 9/2018 | Roth | G06F 3/0481 |
| 10,475,338 | B1* | 11/2019 | Noel | G08G 1/04 |
| 2007/0027583 | A1* | 2/2007 | Tamir | G08G 1/164 |
| | | | | 701/1 |
| 2014/0160252 | A1* | 6/2014 | Randler | B60Q 9/008 |
| | | | | 348/47 |

(Continued)

FOREIGN PATENT DOCUMENTS

JP 2009-204570 A 9/2009
JP 2013-114365 A 6/2013

*Primary Examiner* — Santiago Garcia
(74) *Attorney, Agent, or Firm* — Oblon, McClelland, Maier & Neustadt, L.L.P.

(57) ABSTRACT

An information providing device includes a control unit configured to detect an object entering a road from a first image which is captured from a vehicle and to acquire a second image including the detected object and a communication unit configured to provide the second image to present the second image to a driver under the control of the control unit. A driving support device includes a control unit configured to acquire a second image including a detected object when the object entering a road is detected from a first image captured from a vehicle and to present the acquired second image to a driver.

14 Claims, 9 Drawing Sheets

(56) References Cited

U.S. PATENT DOCUMENTS

| | | | |
|---|---|---|---|
| 2014/0320320 A1* | 10/2014 | Wong | G06K 9/00805 |
| | | | 340/935 |
| 2015/0092056 A1* | 4/2015 | Rau | G06K 9/00791 |
| | | | 348/148 |
| 2015/0331236 A1* | 11/2015 | Roth | B60Q 9/008 |
| | | | 348/48 |
| 2015/0332114 A1* | 11/2015 | Springer | G08G 1/167 |
| | | | 348/148 |
| 2016/0019791 A1* | 1/2016 | Lin | G06K 9/325 |
| | | | 382/105 |
| 2016/0355181 A1* | 12/2016 | Morales Teraoka | |
| | | | B60W 10/184 |
| 2017/0052257 A1* | 2/2017 | Ito | G01S 7/484 |
| 2018/0050698 A1* | 2/2018 | Polisson | B60W 30/182 |
| 2018/0352174 A1* | 12/2018 | Kuybeda | G06K 9/00825 |
| 2019/0126831 A1* | 5/2019 | Arciniaga | B60R 1/00 |
| 2019/0144001 A1* | 5/2019 | Choi | B60W 50/14 |
| | | | 701/117 |
| 2019/0347820 A1* | 11/2019 | Golinsky | G08G 1/096775 |
| 2020/0023797 A1* | 1/2020 | Volos | G07C 5/008 |
| 2020/0164799 A1* | 5/2020 | Nowakowski | B60R 1/00 |

* cited by examiner

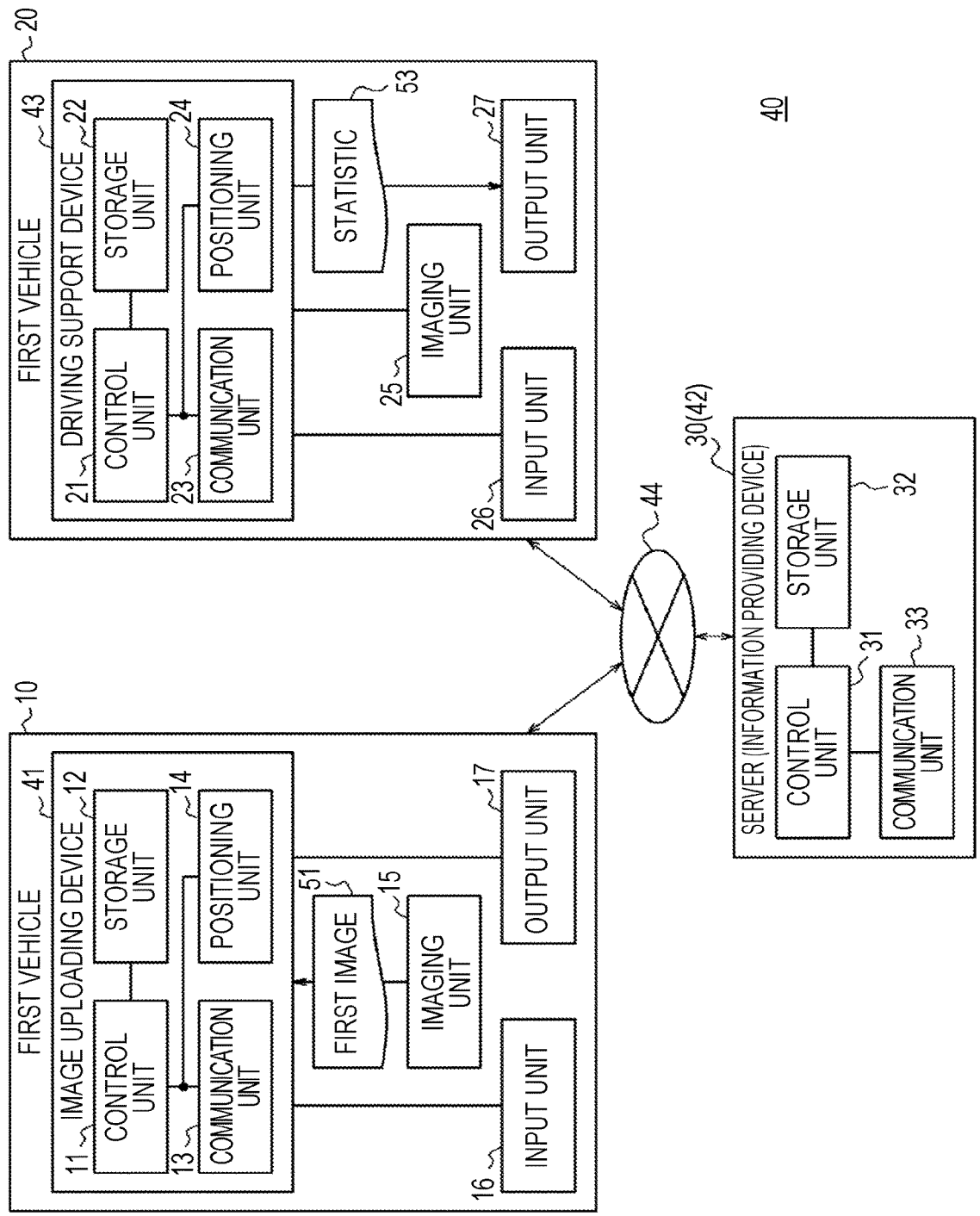

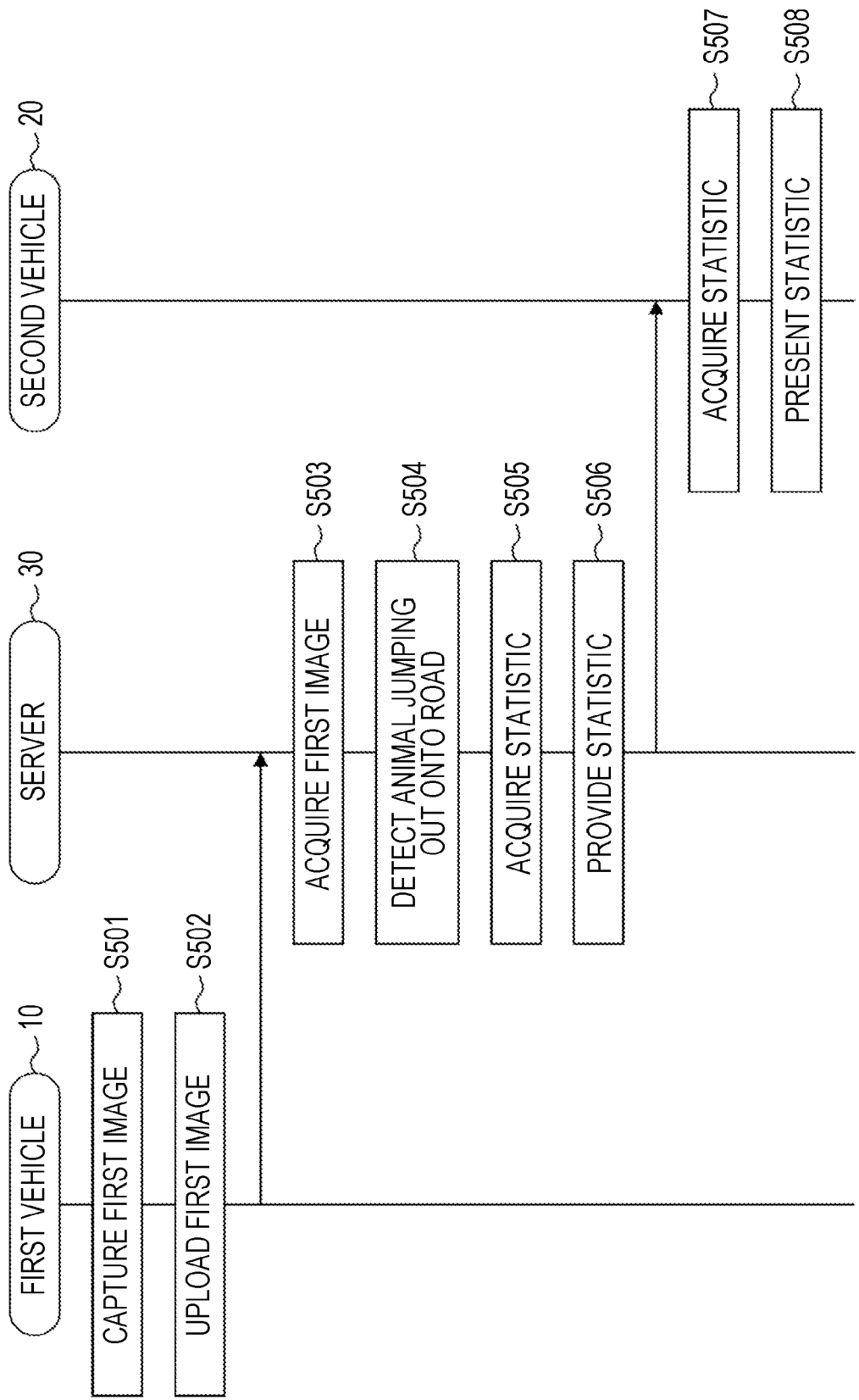

DRIVING SUPPORT DEVICE, VEHICLE, INFORMATION PROVIDING DEVICE, DRIVING SUPPORT SYSTEM, AND DRIVING SUPPORT METHOD

INCORPORATION BY REFERENCE

The disclosure of Japanese Patent Application No. 2018-240114 filed on Dec. 21, 2018 including the specification, drawings and abstract is incorporated herein by reference in its entirety.

BACKGROUND

1. Technical Field

The disclosure relates to a driving support device, a vehicle, an information providing device, a driving support system, and a driving support method.

2. Description of Related Art

Japanese Patent Application Publication No. 2009-204570 (JP 2009-204570 A) discloses a technique of receiving wild animal distribution information from a center server and performing guidance based on types of wild animals which inhabit an inhabited area of wild animals when a vehicle enters the inhabiting area.

SUMMARY

There are road signs for calling attention to jumping-out of animals. However, since a driver may not acquire a real feeling that an animal may jump out by simply seeing such road signs, whether attention is actually paid thereto varies depending on drivers.

In the technique described in JP 2009-204570 A, when a vehicle enters an inhabited area of wild animals, guidance such as "warning" or "caution" is performed depending on a danger such as the ferocity of an animal which may appear. However, in such guidance, a real feeling that an animal is liable to appear may not be obtained with the road signs.

The disclosure is for enabling a driver to obtain a real feeling that an object such as an animal is liable to enter a road on which there is a likelihood of an object entering the road.

According to an embodiment of the disclosure, there is provided a driving support device including a control unit configured to acquire a second image including a detected object when an object entering a road is detected from a first image captured from a vehicle and to present the acquired second image to a driver.

According to an embodiment of the disclosure, there is provided an information providing device including: a control unit configured to detect an object entering a road from a first image which is captured from a vehicle and to acquire a second image including the detected object; and a communication unit configured to provide the second image to present the second image to a driver under the control of the control unit.

According to an embodiment of the disclosure, there is provided a driving support method including: causing an imaging unit to capture a first image from a vehicle; causing a control unit to detect an object entering a road from the first image captured by the imaging unit; and causing an output unit to display a second image including the object detected by the control unit to present the second image to a driver.

According to an embodiment of the disclosure, there is provided a driving support device including a control unit configured to acquire a statistic of a detection result when an object entering a road is detected from an image captured from at least one vehicle and to present the acquired statistic to a driver.

According to an embodiment of the disclosure, there is provided an information providing device including: a control unit configured to detect an object entering a road from an image captured from at least one vehicle and to acquire a statistic of a detection result; and a communication unit configured to provide the statistic to present the statistic to a driver under the control of the control unit.

According to an embodiment of the disclosure, there is provided a driving support method including: causing an imaging unit to capture an image from a vehicle; causing a control unit to detect an object entering a road from the image captured by the imaging unit; and causing an output unit to display a statistic of a detection result of the control unit to present the statistic to a driver.

According to the embodiments of the disclosure, it is possible to enable a driver to obtain a feeling of reality that an object such as an animal is liable to enter a road with a likelihood of an object entering the road.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9 is a block diagram illustrating a configuration of a driving support system according to a fifth embodiment; and FIG. 10 is a flowchart illustrating a flow of operations of the driving support system according to the fifth embodiment.

DETAILED DESCRIPTION OF EMBODIMENTS

Figure 1:
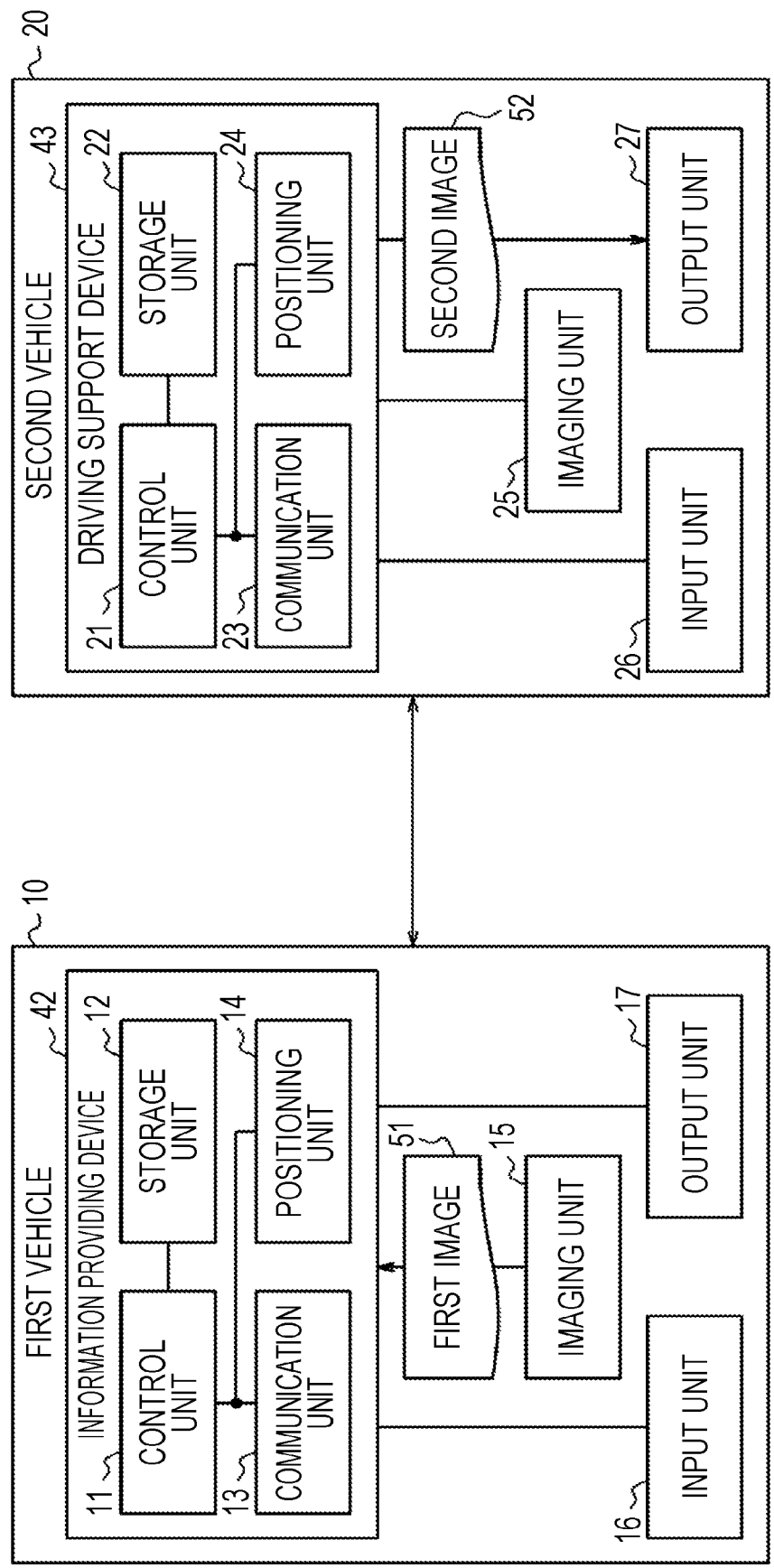
FIG. 1 is a block diagram illustrating a configuration of a driving support system according to a first embodiment.

Hereinafter, embodiments of the disclosure will be described with reference to the accompanying drawings.

In the drawings, the same or corresponding elements will be referred to by the same reference signs. In description of embodiments, description of the same or corresponding elements will be appropriately omitted or simplified.

First Embodiment

The outline of this embodiment will be described below with reference to FIG. 1.

An imaging unit 15 of a first vehicle 10 captures a first image 51 from the first vehicle 10. A control unit 11 of the first vehicle 10 detects an animal that has jumped out onto a road from the first image 51 which is captured by the imaging unit 15. An output unit 27 of a second vehicle 20 which is a vehicle different from the first vehicle 10 displays a second image 52 including the animal detected by the control unit 11 of the first vehicle 10 to present the second image 52 to a driver of the second vehicle 20.

The driver of the second vehicle 20 can clearly recognize that an animal has jumped out onto the road by seeing the second image 52 displayed on the output unit 27. Accordingly, according to this embodiment, the driver of the second vehicle 20 can obtain a feeling of reality that an animal is liable to jump out onto a road with a likelihood of an animal jumping out.

An animal that "is liable to jump out" onto a road is not limited to the same entity as the animal that "has actually jumped out" onto the road and may be another entity. For example, from the second image 52 in which a deer having jumped out onto a road appears, the driver of the second vehicle 20 can obtain a feeling of reality that a deer as well as the deer having jumped out is liable to jump out onto the road.

The type of an animal that "is liable to jump out" onto a road is not limited to the same type as the animal "having jumped out" actually onto the road and may be another type. For example, the driver of the second vehicle 20 can obtain a feeling of reality that animals of types such as a raccoon, a monkey, a boar, or a bear in addition to a deer are liable to jump out onto the road from the second image 52 in which the deer having jumped out onto the road appears.

The first vehicle 10 and the second vehicle 20 are both arbitrary vehicles and both are automobiles in this embodiment. A relation between the first vehicle 10 and the second vehicle 20 is not limited to a one-to-one relation, and may be any of a one-to-multiple relation, a multiple-to-one relation, and a multiple-to-multiple relation.

A configuration of a driving support system 40 according to this embodiment will be described below with reference to FIG. 1.

The driving support system 40 includes an information providing device 42 and a driving support device 43.

The information providing device 42 is provided in the first vehicle 10. The information providing device 42 may be constituted as an onboard device such as a navigation device or may be constituted as an electronic device which is connected to an onboard device for use such as a smartphone.

The information providing device 42 includes a control unit 11, a storage unit 12, a communication unit 13, and a positioning unit 14 as elements.

The control unit 11 includes one or more processors. A general-purpose processor such as a CPU or a dedicated processor specialized in a specific process can be used as each processor. "CPU" is an abbreviation of central processing unit. The control unit 11 may include one or more dedicated circuits or one or more processors of the control unit 11 may be replaced with one or more dedicated circuits. For example, an FPGA or an ASIC can be used as each dedicated circuit. "FPGA" is an abbreviation of field-programmable gate array. "ASIC" is an abbreviation of application specific integrated circuit. The control unit 11 may include one or more ECUs. "ECU" is an abbreviation of electronic control unit. The control unit 11 controls constituent units of the first vehicle 10 including the information providing device 42 and performs information processing associated with the operations of the information providing device 42.

The storage unit 12 includes one or more memories. For example, a semiconductor memory, a magnetic memory, or an optical memory can be used as each memory. Each memory may serve as a main storage device, an auxiliary storage device, or a cache storage device. The storage unit 12 stores information which is used for operation of the information providing device 42 and information which is acquired through the operation of the information providing device 42.

The communication unit 13 includes one or more communication modules. For example, a communication module corresponding to DSRC, LTE, 4G, or 5G can be used as each communication module. "DSRC" is an abbreviation of dedicated short range communications. "LTE" is an abbreviation of long term evolution. "4G" is an abbreviation of 4-th generation. "5G" is an abbreviation of 5-th generation. The communication unit 13 receives information which is used for the operation of the information providing device 42 and transmits information which is acquired through the operation of the information providing device 42.

The positioning unit 14 includes one or more positioning modules. For example, a positioning module corresponding to GPS, QZSS, GLONASS, or Galileo can be used as each positioning module. "GPS" is an abbreviation of global positioning system. "QZSS" is an abbreviation of quasi-zenith satellite system. A satellite of the QZSS is called as a quasi-zenith satellite. "GLONASS" is an abbreviation of global navigation satellite system. The positioning unit 14 acquires position information of the first vehicle 10.

The function of the information providing device 42 is embodied by causing a processor included in the control unit 11 to execute an information providing program according to this embodiment. That is, the function of the information providing device 42 is embodied in software. The information providing program is a program for causing a computer to realize functions corresponding to processes of steps included in the operation of the information providing device 42 by causing the computer to perform the processes of steps. That is, the information providing program is a program for causing a computer to serve as the information providing device 42.

The program can be recorded on a computer-readable recording medium. For example, a magnetic recording medium, an optical disc, a magneto-optical recording medium, or a semiconductor memory can be used as the computer-readable recording medium. Distribution of the program is performed, for example, by selling, transferring, or renting a portable recording medium such as a DVD or a CD-ROM on which the program is recorded. "DVD" is an abbreviation of digital versatile disc. "CD-ROM" is an abbreviation of compact disc read only memory. The program may be distributed by storing the program in a storage of a server and transmitting the program from the server to another computer via a network. The program may be provided as a program product.

A computer temporarily stores, for example, a program recorded on a portable recording medium or a program transmitted from the server in a memory. The computer reads the program stored in the memory using a processor and causes the processor to perform processes based on the read program. The computer may read a program directly from a portable recording medium and perform processes based on the program. The computer may sequentially perform processes based on the received program when the program is transmitted from the server to the computer. Instead of transmitting a program from the server to the computer, the processes may be performed by a so-called ASP type service of realizing a function through only execution instruction and result acquisition. "ASP" is an abbreviation of application service provider. The program includes information which is provided for processing in a computer and which is equivalent to a program. For example, data which is not a direct command for a computer but has characteristics defining processes of a computer corresponds to "information equivalent to a program."

Some or all functions of the information providing device 42 may be realized by a dedicated circuit included in the control unit 11. That is, some or all functions of the information providing device 42 may be realized in hardware.

The first vehicle 10 includes an imaging unit 15, an input unit 16, and an output unit 17 in addition to the information providing device 42. In the first vehicle 10, the imaging unit 15, the input unit 16, and the output unit 17 may be a part of the information providing device 42.

The imaging unit 15 includes one or more onboard cameras. For example, a front camera, a side camera, or a rear camera can be used as each onboard camera. The imaging unit 15 may include one or more onboard radars or one or more onboard LiDARs, or one or more onboard cameras of the imaging unit 15 may be replaced with one or more onboard radars or one or more onboard LiDARs. "LiDAR" is an abbreviation of light detection and ranging. The imaging unit 15 captures an image from the first vehicle 10.

The input unit 16 includes one or more input interfaces. For example, a physical key, a capacitive key, a pointing device, a touch screen which is incorporated into an onboard display, or an onboard microphone can be used as each input interface. The input unit 16 receives an input of information which is used for operation of the information providing device 42 from a user such as a driver of the first vehicle 10.

The output unit 17 includes one or more output interfaces. For example, an onboard display or an onboard speaker can be used as each output interface. For example, an LCD or an organic EL display can be used as the onboard display. "LCD" is an abbreviation of liquid crystal display. "EL" is an abbreviation of electroluminescence. The output unit 17 outputs information which is acquired through the operation of the information providing device 42 to a user.

The driving support device 43 is provided in the second vehicle 20. The driving support device 43 may be constituted as an onboard device such as a navigation device or may be constituted as an electronic device which is connected to an onboard device for use such as a smartphone.

The driving support device 43 includes a control unit 21, a storage unit 22, a communication unit 23, and a positioning unit 24 as elements.

The control unit 21 includes one or more processors. A general-purpose processor such as a CPU or a dedicated processor specialized in a specific process can be used as each processor. The control unit 21 may include one or more dedicated circuits or one or more processors of the control unit 21 may be replaced with one or more dedicated circuits. For example, an FPGA or an ASIC can be used as each dedicated circuit. The control unit 21 may include one or more ECUs. The control unit 21 controls constituent units of the second vehicle 20 including the driving support device 43 and performs information processing associated with the operations of the driving support device 43.

The storage unit 22 includes one or more memories. For example, a semiconductor memory, a magnetic memory, or an optical memory can be used as each memory. Each memory may serve as a main storage device, an auxiliary storage device, or a cache storage device. The storage unit 22 stores information which is used for operation of the driving support device 43 and information which is acquired through the operation of the driving support device 43.

The communication unit 23 includes one or more communication modules. For example, a communication module corresponding to DSRC, LTE, 4G, or 5G can be used as each communication module. The communication unit 23 receives information which is used for the operation of the driving support device 43 and transmits information which is acquired through the operation of the driving support device 43.

The positioning unit 24 includes one or more positioning modules. For example, a positioning module corresponding to GPS, QZSS, GLONASS, or Galileo can be used as each positioning module. The positioning unit 24 acquires position information of the second vehicle 20.

The function of the driving support device 43 is embodied by causing a processor included in the control unit 21 to execute a driving support program according to this embodiment. That is, the function of the driving support device 43 is embodied in software. The driving support program is a program for causing a computer to realize functions corresponding to processes of steps included in the operation of the driving support device 43 by causing the computer to perform the processes of steps. That is, the driving support program is a program for causing a computer to serve as the driving support device 43.

Some or all functions of the driving support device 43 may be realized by a dedicated circuit included in the control unit 21. That is, some or all functions of the driving support device 43 may be realized in hardware.

The second vehicle 20 includes an imaging unit 25, an input unit 26, and an output unit 27 in addition to the driving support device 43. In the second vehicle 20, the imaging unit 25, the input unit 26, and the output unit 27 may be a part of the driving support device 43.

The imaging unit 25 includes one or more onboard cameras. For example, a front camera, a side camera, or a rear camera can be used as each onboard camera. The imaging unit 25 may include one or more onboard radars or one or more onboard LiDARs, or one or more onboard cameras of the imaging unit 25 may be replaced with one or more onboard radars or one or more onboard LiDARs. The imaging unit 25 captures an image from the second vehicle 20.

The input unit 26 includes one or more input interfaces. For example, a physical key, a capacitive key, a pointing device, a touch screen which is incorporated into an onboard display, or an onboard microphone can be used as each input interface. The input unit 26 receives an input of information which is used for operation of the driving support device 43 from a user such as a driver of the second vehicle 20.

The output unit 27 includes one or more output interfaces. For example, an onboard display or an onboard speaker can be used as each output interface. For example, an LCD or an organic EL display can be used as the onboard display. The output unit 27 outputs information which is acquired through the operation of the driving support device 43 to a user.

Figure 2:
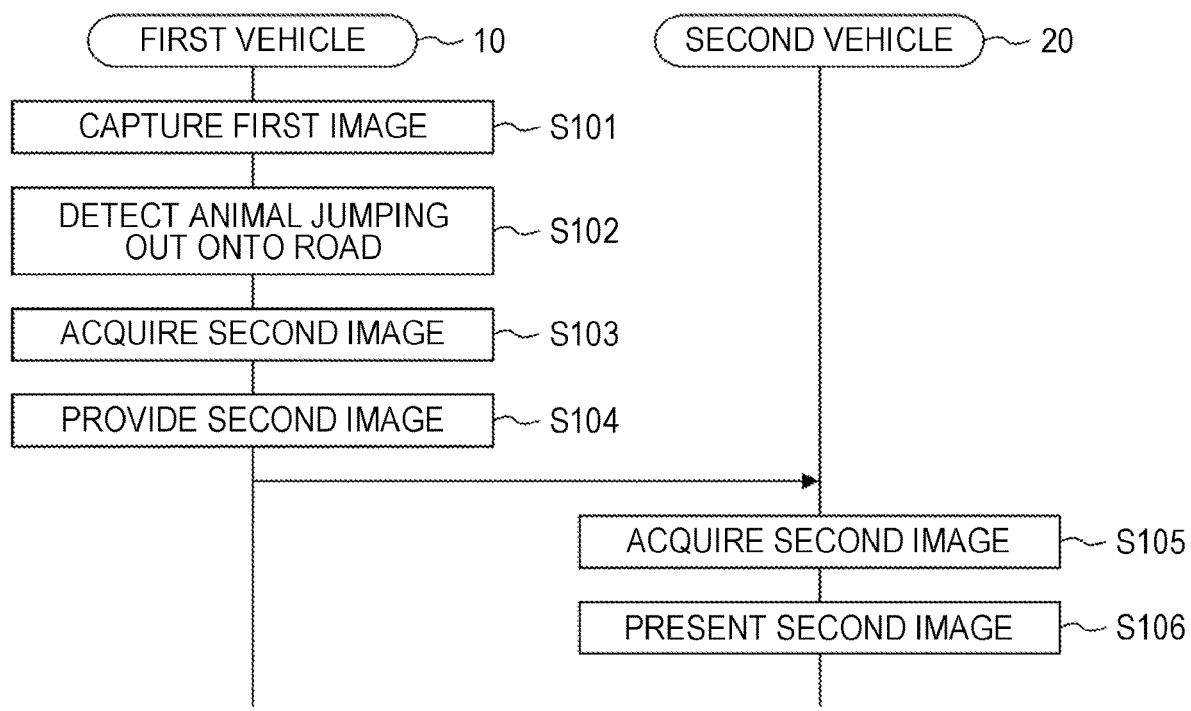
FIG. 2 is a flowchart illustrating a flow of operations of the driving support system according to the first embodiment.

The operation of the driving support system 40 according to this embodiment will be described below with reference to FIG. 2 in addition to FIG. 1. The operation of the driving support system 40 corresponds to a driving support method according to this embodiment.

The processes of Steps S101 to S104 are performed by the first vehicle 10.

In Step S101, the imaging unit 15 captures a first image 51 from the first vehicle 10.

Specifically, the imaging unit 15 continuously captures a moving image in front of the first vehicle 10 as the first image 51 or intermittently captures a still image in front of the first vehicle 10 as the first image 51.

The imaging unit 15 may capture an image in the side or rear of the first vehicle 10 as the first image 51 in addition to the image in front of the first vehicle 10.

In Step S102, the control unit 11 of the information providing device 42 detects an animal that has jumped out onto a road Rx from the first image 51 captured by the imaging unit 15.

Specifically, the control unit 11 acquires the first image 51 captured by the imaging unit 15 and time information indicating a time at which the first image 51 has been captured from the imaging unit 15. The control unit 11 acquires position information of the first vehicle 10 at the time indicated by the acquired time information from the positioning unit 14. The control unit 11 stores the acquired first image 51 in the storage unit 12 and stores the acquired time information and the acquired position information in the storage unit 12 in correlation with the first image 51. The control unit 11 analyzes the acquired first image 51 and determines whether an animal appears in the first image 51 and whether the animal has entered the road Rx when the animal appears in the first image 51. For example, an image recognition technique using machine learning can be used as a technique of recognizing an animal and a road in an image.

The road Rx is an arbitrary road and is a road on which a sign Sx indicating that an animal is liable to jump out is installed in this embodiment. Accordingly, the control unit 11 determines whether the road appearing in the first image 51 is the road Rx by comparing the position information acquired from the positioning unit 14 with map information, which is stored in advance in the storage unit 12, indicating the position of the road Rx or a position of a road group which includes the road Rx and in which the sign Sx is installed. Alternatively, the control unit 11 determines whether the road appearing in the first image 51 is the road Rx by analyzing the first image 51 and determining whether the sign Sx is installed on the road. Alternatively, the control unit 11 determines whether the road appearing in the first image 51 is the road Rx by acquiring information of a road from a road-side unit near the first vehicle 10 via the communication unit 13 and referring to the acquired information.

The control unit 11 may store information indicating the time at which the control unit 11 has acquired the first image 51 from the imaging unit 15 as time information in the storage unit 12. In this case, the control unit 11 may not acquire the time information from the imaging unit 15.

In Step S103, the control unit 11 acquires a second image 52 including an animal detected in Step S102.

Specifically, when an animal appears in the first image 51 analyzed in Step S102 and it is determined that the animal enters the road Rx, the control unit 11 stores the first image 51 as the second image 52 in the storage unit 12.

When an animal jumping out onto the road Rx appears in a series of frames of a moving image captured as the first image 51, the control unit 11 selects one or more frames of the series of frames as the second image 52. Alternatively, when an animal jumping out onto the road Rx appears in a series of still images captured as the first image 51, the control unit 11 selects one or more still images out of the series of still images as the second image 52.

The control unit 11 may perform processing such as change in size or change in resolution on the first image 51 in which an animal jumping out onto the road Rx appears and then store the processed first image 51 as the second image 52 in the storage unit 12.

When it is determined that an animal does not appear in the first image 51 or it is determined that an animal appears but the animal does not enter the road Rx, the control unit 11 may delete the first image 51 and the time information and the position information corresponding to the first image 51 from the storage unit 12.

In Step S104, the communication unit 13 of the information providing device 42 provides the second image 52 acquired by the control unit 11 to present the second image 52 to a driver of the second vehicle 20 under the control of the control unit 11.

Specifically, the control unit 11 inputs the second image 52 stored in the storage unit 12 and the time information and the position information, which are stored in the storage unit 12 and correspond to the first image 51 serving as a basis of the second image 52, to the communication unit 13. The communication unit 13 transmits the second image 52, the time information, and the position information which are input from the control unit 11 to the driving support device 43 of the second vehicle 20 by vehicle-to-vehicle communication, road-to-vehicle communication, or communication via a network.

The processes of Steps S105 and S106 are performed by the second vehicle 20.

In Step S105, the communication unit 23 of the driving support device 43 acquires the second image 52 which is provided from the information providing device 42 of the first vehicle 10.

Specifically, the communication unit 23 receives the second image 52, the time information, and the position information which are transmitted from the information providing device 42 of the first vehicle 10 by vehicle-to-vehicle communication, road-to-vehicle communication, or communication via a network.

In Step S106, the control unit 21 of the driving support device 43 presents the second image 52 acquired by the communication unit 23 to the driver of the second vehicle 20. The control unit 21 uses the output unit 27 as means for presenting the second image 52. That is, the output unit 27 displays the second image 52 acquired by the communication unit 23 to present the second image 52 to the driver of the second vehicle 20 under the control of the control unit 21.

Specifically, the control unit 21 acquires the second image 52, the time information, and the position information received by the communication unit 23 from the communication unit 23. The control unit 21 stores the acquired second image 52 in the storage unit 22 and stores the acquired time information and the acquired position information in the storage unit 22 in correlation with the second image 52. The control unit 21 inputs the second image 52 stored in the storage unit 22 and the time information and the position information which are stored in the storage unit 22 and correspond to the second image 52 to the output unit 27. The output unit 27 displays a screen including the second image 52, the time information, and the position information which are input from the control unit 21. In the screen, the position information may be displayed in characters and is displayed in the format in which a figure such as an icon is disposed at a corresponding position on a map in this embodiment. A figure such as another icon may be disposed at a current position of the second vehicle 20 on the same map. In this case, the control unit 21 acquires position information of the second vehicle 20 at the current time from the positioning unit 24 as information indicating the current position of the second vehicle 20. An amount of information in the screen can be appropriately adjusted such that safe driving is not hindered.

The control unit 21 may present the second image 52 at any time and the second image 52 is presented to the driver of the second vehicle 20 when the second vehicle 20 travels on the road Rx in this embodiment. Accordingly, the control unit 21 determines whether the second vehicle 20 is currently traveling on the road Rx by comparing the position information acquired from the positioning unit 24 with map information which is stored in advance in the storage unit 22 and indicates the position of the road Rx. The control unit 21 presents the second image 52 to the driver of the second vehicle 20, for example, when the second vehicle 20 reaches a point at which the sign Sx of the road Rx is visible.

The control unit 21 may present the second image 52 to the driver of the second vehicle 20 before the second vehicle 20 travels on the road Rx. In this case, the control unit 21 predicts whether the second vehicle 20 will travel on the road Rx in the future by comparing the position information acquired from the positioning unit 24 with the map information. Alternatively, when a traveling route of the second vehicle 20 is set by a navigation function, the control unit 21 predicts whether the second vehicle 20 will travel on the road Rx in the future by determining whether the road Rx is included in the set traveling route.

As described above, in this embodiment, the control unit 11 of the information providing device 42 detects an animal jumping out onto the road Rx from the first image 51 captured from the first vehicle 10 and acquires the second image 52 including the detected animal. The communication unit 13 of the information providing device 42 provides the second image 52 to present the second image 52 to the driver of the second vehicle 20 under the control of the control unit 11. When an animal jumping out onto the road Rx is detected from the first image 51 captured from the first vehicle 10, the control unit 21 of the driving support device 43 acquires the second image 52 including the detected animal and presents the acquired second image 52 to the driver of the second vehicle 20. Accordingly, according to this embodiment, the driver of the second vehicle 20 can obtain a feeling of reality that an animal is liable to jump out onto the road Rx. As a result, it is possible to improve a driver's power of attention and to enable safer driving.

An object to be detected has only to be an object that is liable to enter the road, is not limited to an animal, and may be an object such as falling stones or a person such as a child or an old person. In any case, the control unit 11 of the information providing device 42 acquires the second image 52 including the detected object. The control unit 21 of the driving support device 43 acquires the second image 52 including the detected object and presents the acquired second image 52 to the driver of the second vehicle 20. Accordingly, the driver of the second vehicle 20 can obtain a real feeling that an object is liable to enter a road which an object is liable to enter.

In this embodiment, particularly, when a sign Sx indicating that an animal is liable to jump out is installed on a road Rx, the control unit 11 of the information providing device 42 acquires an image including an animal jumping out onto the road Rx as the second image 52. Particularly, when the sign Sx is installed on the road Rx, the control unit 21 of the driving support device 43 acquires an image including an animal jumping out onto the road Rx as the second image 52 and presents the acquired second image 52 to the driver of the second vehicle 20. Accordingly, it is possible to give a driver a real feeling that an animal is liable to jump out, which cannot be obtained by simply seeing the sign Sx.

When an object to be detected includes falling stones and a sign Sy indicating that falling stones are liable is installed on a road Ry, the control unit 11 of the information providing device 42 acquires an image including falling stones on the road Ry as the second image 52. When the sign Sy is installed on the road Ry, the control unit 21 of the driving support device 43 acquires an image including falling stones on the road Ry as the second image 52 and presents the acquired second image 52 to the driver of the second vehicle 20. Accordingly, it is possible to give a driver a real feeling that falling stones are liable to occur, which cannot be obtained by simply seeing the sign Sy. For example, the driver of the second vehicle 20 can obtain a real feeling that falling stones are liable to occur again on the road Ry by watching the second image 52 in which falling stones on the road Ry appear.

When an object to be detected includes a child and a sign Sz indicating that there is a school, a kindergarten, or a child care center is installed on a road Rz, the control unit 11 of the information providing device 42 acquires an image including a child jumping out onto the road Rz as the second image 52. When the sign Sz is installed on the road Rz, the control unit 21 of the driving support device 43 acquires an image including a child jumping out onto the road Rz as the second image 52 and presents the acquired second image 52 to the driver of the second vehicle 20. Accordingly, it is possible to give a driver a real feeling that a child is liable to jump out, which cannot be obtained by simply seeing the sign Sz. For example, the driver of the second vehicle 20 can obtain a real feeling that another child in addition to the child is liable to jump out onto the road Rz by watching the second image 52 in which a child jumping out onto the road Rz appears.

When the second vehicle 20 is in a fully automated driving mode, the control unit 21 of the driving support device 43 may not present the second image 52 to the driver of the second vehicle 20. The fully automated driving mode corresponds to "level 5" in level classification of the SAE, but may include "level 4" or may include automated driving levels under another definition. "SAE" is an abbreviation of Society of Automotive Engineers.

Second Embodiment

Figure 3:
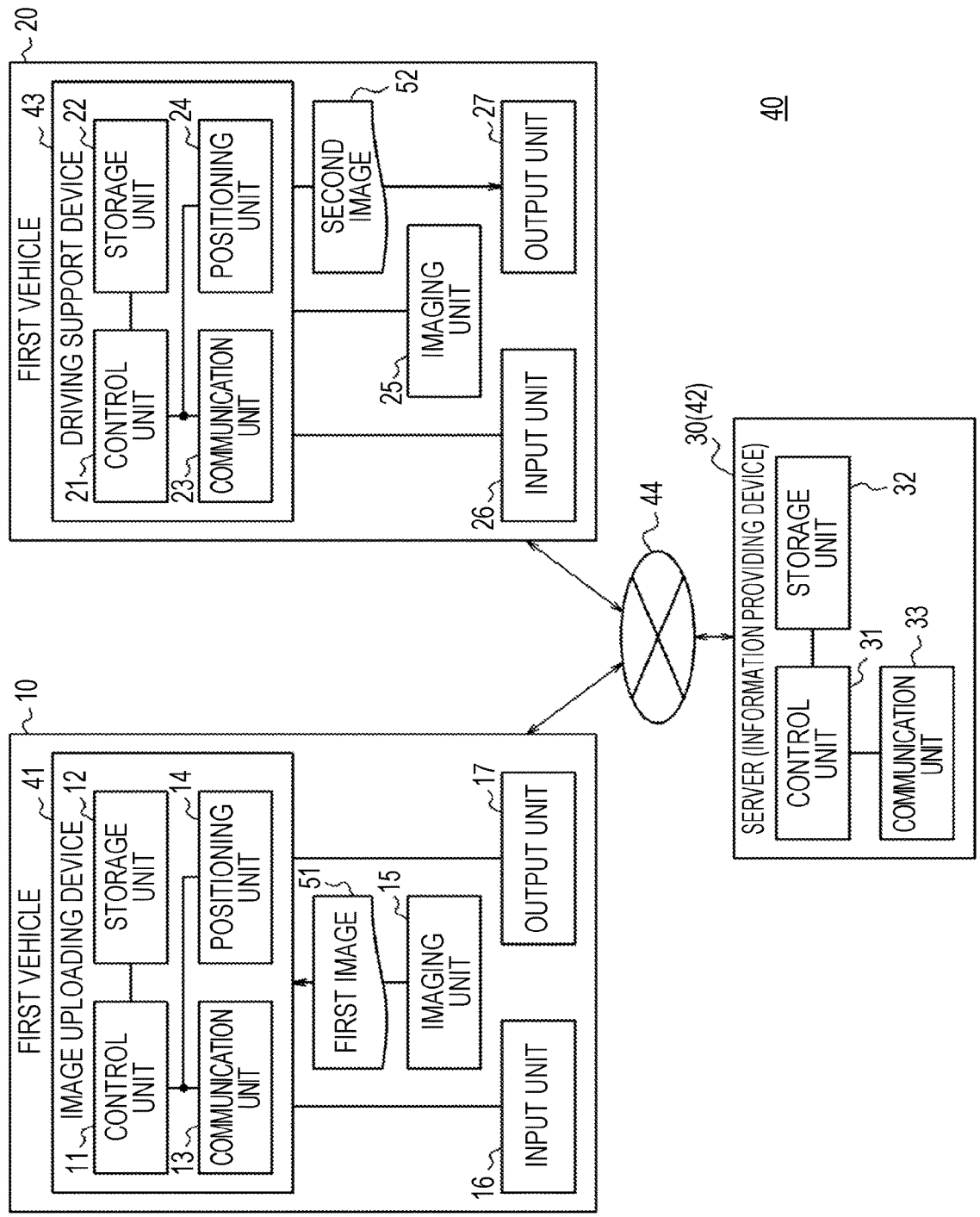
FIG. 3 is a block diagram illustrating a configuration of a driving support system according to a second embodiment.

The outline of this embodiment will be described below with reference to FIG. 3.

In the first embodiment, the control unit 11 of the first vehicle 10 detects an animal jumping out onto a road from a first image 51 captured by the imaging unit 15 of the first vehicle 10. On the other hand, in this embodiment, a control unit 31 of a server 30 detects an animal jumping out onto a road from the first image 51 which is captured by the imaging unit 15 of the first vehicle 10. The output unit 27 of the second vehicle 20 displays a second image 52 including an animal detected by the control unit 31 of the server 30 to present the second image 52 to a driver of the second vehicle 20.

As in the first embodiment, the driver of the second vehicle 20 can clearly recognize that an animal jumps out actually onto the road by watching the second image 52 displayed on the output unit 27. Accordingly, according to this embodiment, the driver of the second vehicle 20 can obtain a real feeling that an animal is liable to jump out onto a road onto which an animal is liable to jump out.

The configuration of the driving support system 40 according to this embodiment will be described below with reference to FIG. 3. Description of elements which are common to those in the first embodiment will be appropriately omitted or simplified.

The driving support system 40 includes an image uploading device 41, an information providing device 42, and a driving support device 43.

The image uploading device 41 and the information providing device 42 can communicate with each other via a network 44 such as a mobile communication network and the Internet. The information providing device 42 and the driving support device 43 can also communicate with each other via the network 44.

The image uploading device 41 is provided in the first vehicle 10. The image uploading device 41 may be constituted as an onboard device such as a navigation device or may be constituted as an electronic device which is connected to an onboard device for use such as a smartphone.

The image uploading device 41 includes a control unit 11, a storage unit 12, a communication unit 13, and a positioning unit 14 as elements.

The control unit 11 controls constituent units of the first vehicle 10 including the image uploading device 41 and performs information processing associated with operation of the image uploading device 41.

The storage unit 12 stores information which is used for the operation of the image uploading device 41 and information which is acquired through the operation of the image uploading device 41.

The communication unit 13 receives information which is used for the operation of the image uploading device 41 and transmits information which is acquired through the operation of the image uploading device 41.

The function of the image uploading device 41 is embodied by causing a processor included in the control unit 11 to execute an image uploading program according to this embodiment. That is, the function of the image uploading device 41 is embodied in software. The image uploading program is a program for causing a computer to realize functions corresponding to processes of steps included in the operation of the image uploading device 41 by causing the computer to perform the processes of steps. That is, the image uploading program is a program for causing a computer to serve as the image uploading device 41.

Some or all functions of the image uploading device 41 may be realized by a dedicated circuit included in the control unit 11. That is, some or all functions of the image uploading device 41 may be realized in hardware.

The first vehicle 10 includes an imaging unit 15, an input unit 16, and an output unit 17 in addition to the image uploading device 41. In the first vehicle 10, the imaging unit 15, the input unit 16, and the output unit 17 may be a part of the image uploading device 41.

The input unit 16 receives an input of information which is used for the operation of the image uploading device 41 from a user such as a driver of the first vehicle 10.

The output unit 17 outputs information which is acquired through the operation of the image uploading device 41 to a user.

In this embodiment, the information providing device 42 is not provided in the first vehicle 10 but is provided outside the first vehicle 10 such as in a data center. The information providing device 42 is constituted as a server 30 which belongs to a cloud computing system or other computing system.

The information providing device 42 includes a control unit 31, a storage unit 32, and a communication unit 33 as elements.

The control unit 31 includes one or more processors. A general-purpose processor such as a CPU or a dedicated processor specialized in a specific process can be used as each processor. The control unit 31 may include one or more dedicated circuits or one or more processors of the control unit 31 may be replaced with one or more dedicated circuits. For example, an FPGA or an AISC can be used as each dedicated circuit. The control unit 31 may include one or more ECUs. The control unit 31 controls constituent units of the server 30 which is the information providing device 42 and performs information processing associated with the operation of the information providing device 42.

The storage unit 32 includes one or more memories. For example, a semiconductor memory, a magnetic memory, or an optical memory can be used as each memory. Each memory may serve as a main storage device, an auxiliary storage device, or a cache storage device. The storage unit 32 stores information which is used for operation of the information providing device 42 and information which is acquired through the operation of the information providing device 42.

The communication unit 33 includes one or more communication modules. For example, a communication module corresponding to a LAN standard can be used as each communication module. "LAN" is an abbreviation of local area network. The communication unit 33 receives information which is used for the operation of the information providing device 42 and transmits information which is acquired through the operation of the information providing device 42.

The function of the information providing device 42 is embodied by causing a processor included in the control unit 31 to execute an information providing program according to this embodiment. That is, the function of the information providing device 42 is embodied in software. The information providing program is a program for causing a computer to realize functions corresponding to processes of steps included in the operation of the information providing device 42 by causing the computer to perform the processes of steps. That is, the information providing program is a program for causing a computer to serve as the information providing device 42.

Some or all functions of the information providing device 42 may be realized by a dedicated circuit included in the control unit 31. That is, some or all functions of the information providing device 42 may be realized in hardware.

As in the first embodiment, the driving support device 43 is provided in the second vehicle 20.

As in the first embodiment, the second vehicle 20 includes an imaging unit 25, an input unit 26, and an output unit 27 in addition to the driving support device 43.

Figure 4:
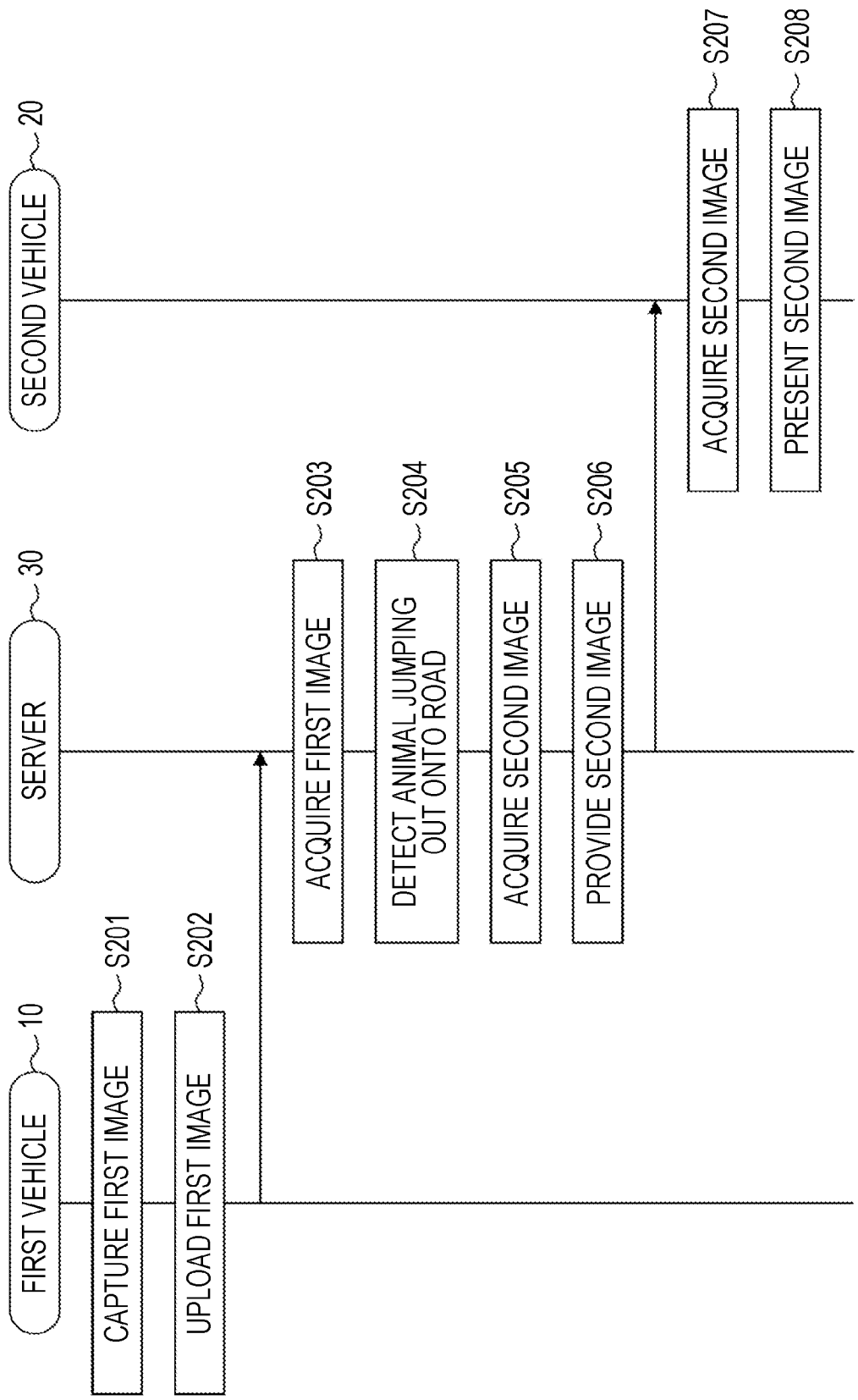
FIG. 4 is a flowchart illustrating a flow of operations of the driving support system according to the second embodiment.

The operation of the driving support system 40 according to this embodiment will be described below with reference to FIG. 4 in addition to FIG. 3. Description of elements which are common to those in the first embodiment will be appropriately omitted or simplified. The operation of the driving support system 40 corresponds to a driving support method according to this embodiment.

The processes of Steps S201 and S202 are performed by the first vehicle 10.

The process of Step S201 is the same as the process of Step S101 and thus description thereof will not be repeated.

In Step S202, the communication unit 13 of the image uploading device 41 uploads a first image 51 captured by the imaging unit 15 to the server 30 under the control of the control unit 11.

Specifically, the control unit 11 acquires the first image 51 captured by the imaging unit 15 and time information indicating a time at which the first image 51 has been captured from the imaging unit 15. The control unit 11 acquires position information of the first vehicle 10 at the time indicated by the acquired time information from the positioning unit 14. The control unit 11 stores the acquired first image 51 in the storage unit 12 and stores the acquired time information and the acquired position information in the storage unit 12 in correlation with the first image 51. The control unit 11 inputs the first image 51 stored in the storage unit 12 and the time information and the position information, which are stored in the storage unit 12 and corresponds to the first image 51, to the communication unit 13. The communication unit 13 transmits the first image 51, the time information, and the position information which are input from the control unit 11 to the information providing device 42 which is the server 30 via the network 44.

The processes of Steps S203 to S206 are performed by the server 30.

In Step S203, the communication unit 33 of the information providing device 42 acquires the first image 51 which is uploaded from the image uploading device 41 of the first vehicle 10.

Specifically, the communication unit 33 receives the first image 51, the time information, and the position information which is transmitted from the image uploading device 41 of the first vehicle 10 via the network 44.

In Step S204, the control unit 31 of the information providing device 42 detects an animal jumping out onto the road Rx from the first image 51 captured by the imaging unit 15 of the first vehicle 10.

Specifically, the control unit 31 acquires the first image 51, the time information, and the position information received by the communication unit 33 from the communication unit 33. The control unit 31 stores the acquired first image 51 in the storage unit 32 and stores the acquired time information and the acquired position information in the storage unit 32 in correlation with the first image 51. The control unit 31 analyzes the acquired first image 51 and determines whether an animal appears in the first image 51 and whether the animal enters a road Rx when the animal appears in the first image 51. For example, an image recognition technique using machine learning can be used as a technique of recognizing an animal and a road in an image.

The road Rx is an arbitrary road and is a road in which a sign Sx indicating that an animal is liable to jump out is installed in this embodiment. Accordingly, the control unit 31 determines whether the road appearing in the first image 51 is the road Rx by comparing the position information acquired from the communication unit 33 with map information, which is stored in advance in the storage unit 32, indicating the position of the road Rx or a position of a road group which includes the road Rx and in which the sign Sx is installed. Alternatively, the control unit 31 determines whether the road appearing in the first image 51 is the road Rx by analyzing the first image 51 and determining whether the sign Sx is installed on the road. Alternatively, the control unit 31 determines whether the road appearing in the first image 51 is the road Rx by acquiring information of a road on which the first vehicle 10 is traveling from the first vehicle 10 via the communication unit 33 and referring to the acquired information.

The control unit 31 may store information indicating the time at which the communication unit 33 has acquired the first image 51 from the image uploading device 41 of the first vehicle 10 in the storage unit 32. In this case, the communication unit 33 may not acquire the time information from the image uploading device 41 of the first vehicle 10.

In Step S205, the control unit 31 acquires a second image 52 including an animal detected in Step S202.

Specifically, when an animal appears in the first image 51 analyzed in Step S202 and it is determined that the animal enters the road Rx, the control unit 31 stores the first image 51 as the second image 52 in the storage unit 32.

In Step S206, the communication unit 33 of the information providing device 42 provides the second image 52 acquired by the control unit 31 to present the second image 52 to the driver of the second vehicle 20 under the control of the control unit 31.

Specifically, the control unit 31 inputs the second image 52 stored in the storage unit 32 and the time information and the position information, which are stored in the storage unit 32 and corresponds to the first image 51 serving as a basis of the second image 52, to the communication unit 33. The communication unit 33 transmits the second image 52, the time information, and the position information which are input from the control unit 31 to the driving support device 43 of the second vehicle 20 via the network 44.

The processes of Steps S207 and S208 are performed by the second vehicle 20.

In Step S207, the communication unit 23 of the driving support device 43 acquires the second image 52 provided from the information providing device 42 which is the server 30.

Specifically, the communication unit 23 receives the second image 52, the time information, and the position information which are transmitted from the information providing device 42 which is the server 30 via the network 44.

The process of Step S208 is the same as the process of Step S106 and thus description thereof will not be repeated.

As described above, in this embodiment, the process of analyzing an image is performed by the server 30 outside the first vehicle 10. Accordingly, according to this embodiment, it is possible to simplify the configuration of the first vehicle 10.

As in the first embodiment, an object to be detected has only to be an object that is liable to enter a road, is not limited to an animal, and may be an object such as falling stones or a person such as a child or an old person.

Third Embodiment

Figure 5:
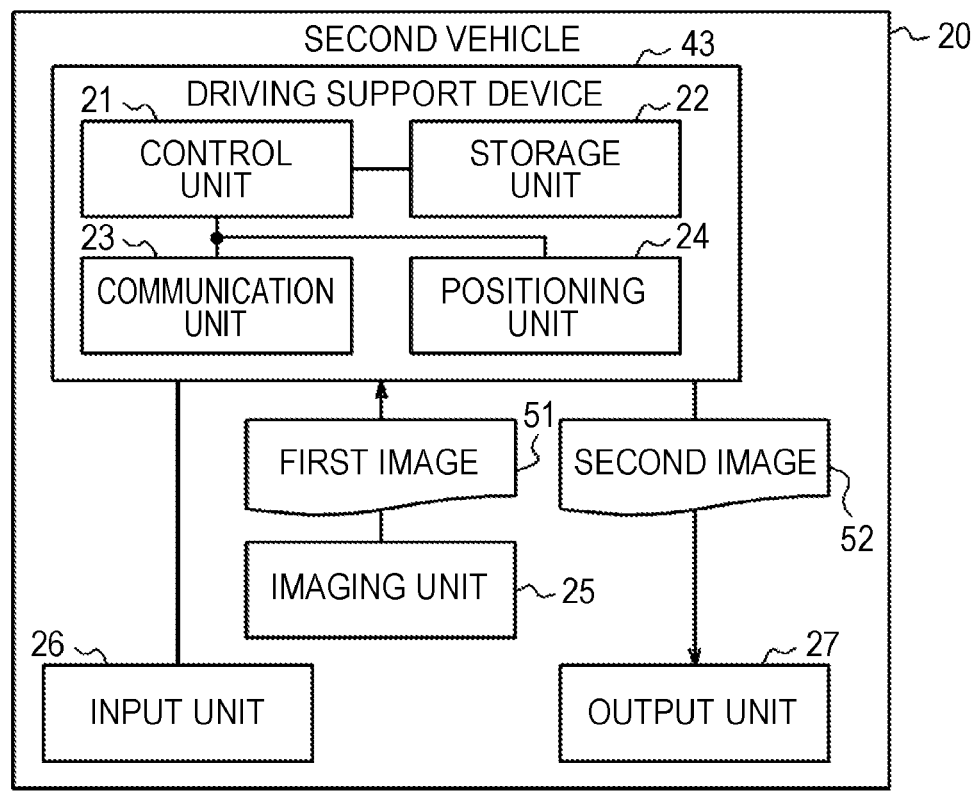
FIG. 5 is a block diagram illustrating a configuration of a driving support system according to a third embodiment.

The outline of this embodiment will be described below with reference to FIG. 5.

In the first embodiment, the control unit 11 of the first vehicle 10 detects an animal jumping out onto a road from a first image 51 which is captured by the imaging unit 15 of the first vehicle 10. On the other hand, in this embodiment, the control unit 21 of the second vehicle 20 detects an animal jumping out onto a road from a first image 51 captured by the imaging unit 25 of the second vehicle 20. The output unit 27 of the second vehicle 20 displays a second image 52 including the animal detected by the control unit 21 of the second vehicle 20 to present the second image 52 to a driver of the second vehicle 20.

As in the first embodiment, the driver of the second vehicle 20 can clearly recognize that an animal jumps out actually onto the road by watching the second image 52 displayed on the output unit 27. Accordingly, according to this embodiment, the driver of the second vehicle 20 can obtain a real feeling that an animal is liable to jump out onto a road onto which an animal is liable to jump out.

Since the first vehicle 10 as in the first embodiment is not required, the second vehicle 20 may be simply referred to as a "vehicle."

The configuration of the driving support system 40 according to this embodiment will be described below with reference to FIG. 5. Description of elements which are common to those in the first embodiment will be appropriately omitted or simplified.

The driving support system 40 includes a driving support device 43. The driving support system 40 may not include the information providing device 42 in the first embodiment.

As in the first embodiment, the driving support device 43 is provided in the second vehicle 20.

As in the first embodiment, the second vehicle 20 includes an imaging unit 25, an input unit 26, and an output unit 27 in addition to the driving support device 43.

Figure 6:
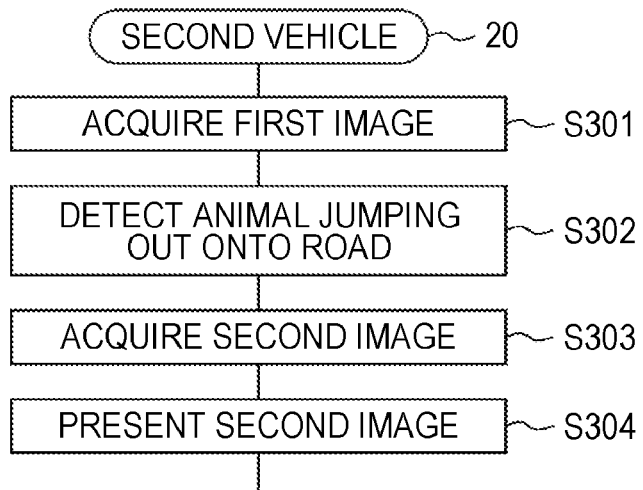
FIG. 6 is a flowchart illustrating a flow of operations of the driving support system according to the third embodiment.

The operation of the driving support system 40 according to this embodiment will be described below with reference to FIG. 6 in addition to FIG. 5. Description of elements which are common to those in the first embodiment will be appropriately omitted or simplified. The operation of the driving support system 40 corresponds to a driving support method according to this embodiment.

The processes of Steps S301 to S304 are performed by the second vehicle 20.

The processes of Steps S301 to S303 are the same as the processes of Steps S101 to S103 except that the first vehicle 10 and the control unit 11, the storage unit 12, the communication unit 13, and the positioning unit 14 of the information providing device 42, and the imaging unit 15 are replaced with the second vehicle 20, the control unit 21, the storage unit 22, the communication unit 23, and the positioning unit 24 of the driving support device 43, and the imaging unit 25, respectively, and thus description thereof will not be repeated.

In Step S304, the control unit 21 presents the acquired second image 52 to the driver of the second vehicle 20. The control unit 21 uses the output unit 27 as means for presenting the second image 52. That is, the output unit 27 displays the second image 52 acquired by the control unit 21 to present the second image 52 to the driver of the second vehicle 20 under the control of the control unit 21.

Specifically, the control unit 21 inputs the second image 52 stored in the storage unit 22 and the time information and the position information, which are stored in the storage unit 22 and correspond to the first image 51 serving as a basis of the second image 52, to the output unit 27. The output unit 27 displays a screen including the second image 52, the time information, and the position information which are input from the control unit 21. In the screen, the position information may be displayed in characters and is displayed in the format in which a figure such as an icon is disposed at a corresponding position on a map in this embodiment. A figure such as another icon may be disposed at a current position of the second vehicle 20 on the same map. In this case, the control unit 21 acquires position information of the second vehicle 20 at the current time from the positioning unit 24 as information indicating the current position of the second vehicle 20.

The control unit 21 may not store the second image 52 in the storage unit 22 but may store the second image 52 in a storage outside the second vehicle 20 such as a cloud storage, acquire the second image 52 via the communication unit 23, and present the acquired second image 52.

The control unit 21 may present the second image 52 at any time and the second image 52 is presented to the driver of the second vehicle 20 when the second vehicle 20 travels on the road Rx at an opportunity other than the time at which the first image 51 has been captured in this embodiment. Accordingly, the control unit 21 ascertains that a predetermined time elapses from the time at which the first image 51 has been captured by referring to the time information, which is stored in the storage unit 22, corresponding to the first image 51. Then, the control unit 21 determines whether the second vehicle 20 is currently traveling on the road Rx by comparing the position information acquired from the positioning unit 24 with map information which is stored in advance in the storage unit 22 and indicates the position of the road Rx. The control unit 21 presents the second image 52 to the driver of the second vehicle 20, for example, when the second vehicle 20 reaches a point at which the sign Sx of the road Rx is visible after a day subsequent to the day on which the first image 51 has been captured.

The control unit 21 may present the second image 52 to the driver of the second vehicle 20 before the second vehicle 20 travels on the road Rx at an opportunity other than the time at which the first image 51 has been captured. In this case, the control unit 21 ascertains that a predetermined time elapses from the time at which the first image 51 has been captured by referring to the time information corresponding to the first image 51. Then, the control unit 21 predicts whether the second vehicle 20 will travel on the road Rx in the future by comparing the position information acquired from the positioning unit 24 with the map information. Alternatively, when a traveling route of the second vehicle 20 is set by a navigation function, the control unit 21 predicts whether the second vehicle 20 will travel on the road Rx in the future by determining whether the road Rx is included in the set traveling route.

When an animal jumping out onto the road Rx appears in the first image 51 but it is estimated that a driver of the first vehicle 10 does not visually recognize the animal jumping out such as when the first image 51 is an image in rear of the first vehicle 10, the control unit 21 may present the second image 52 to the driver of the second vehicle 20 at the same opportunity as capturing the first image 51.

As described above, in this embodiment, the control unit 21 of the driving support device 43 detects an animal jumping out onto the road Rx from the first image 51 captured from the second vehicle 20, acquires a second image 52 including the detected animal, and presents the acquired second image 52 to the driver of the second vehicle 20. Accordingly, according to this embodiment, the driver of the second vehicle 20 can remind that an animal has jumped out when the second vehicle 20 travels on the road Rx again even when the driver has forgotten that the animal has jumped out at the time of traveling on the road Rx in the past. As a result, it is possible to improve the driver's power of attention and to enable safer driving.

An object to be detected has only to be an object that is liable to jump out onto the road, is not limited to an animal, and may be an object such as falling stones or a person such as a child or an old person.

Fourth Embodiment

Figure 7:
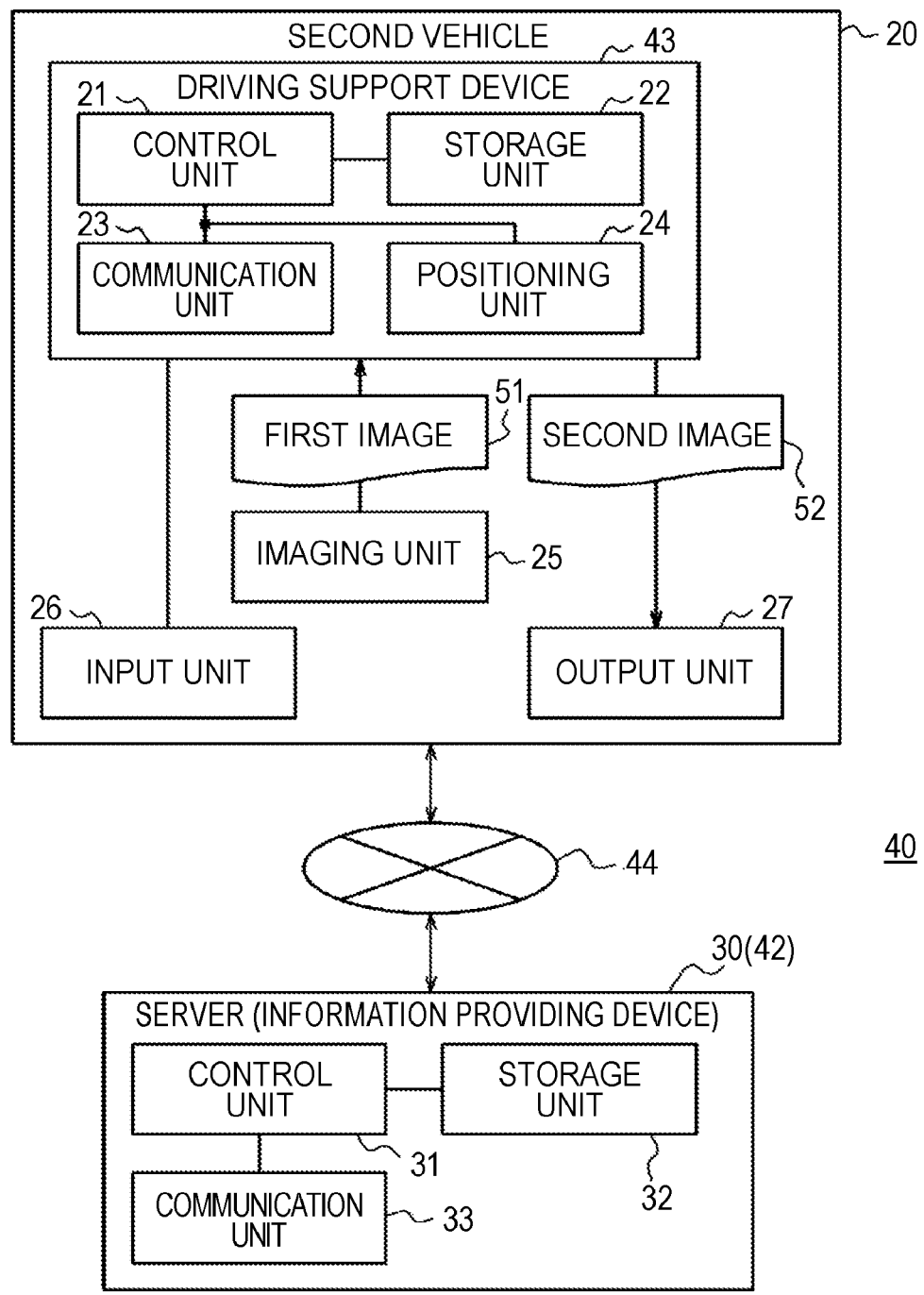
FIG. 7 is a block diagram illustrating a configuration of a driving support system according to a fourth embodiment.

The outline of this embodiment will be described below with reference to FIG. 7.

In this embodiment, the same modification as modification from the first embodiment to the third embodiment is applied to the second embodiment.

In the second embodiment, the control unit 31 of the server 30 detects an animal jumping out onto a road from a first image 51 which is captured by the imaging unit 15 of the first vehicle 10. On the other hand, in this embodiment, the control unit 31 of the server 30 detects an animal jumping out onto a road from a first image 51 captured by the imaging unit 25 of the second vehicle 20. The output unit 27 of the second vehicle 20 displays a second image 52 including the animal detected by the control unit 31 of the server 30 to present the second image 52 to a driver of the second vehicle 20.

As in the second embodiment and the third embodiment, the driver of the second vehicle 20 can clearly recognize that an animal jumps out actually onto the road by watching the second image 52 displayed on the output unit 27. Accordingly, according to this embodiment, the driver of the second vehicle 20 can obtain a real feeling that an animal is liable to jump out onto a road onto which an animal is liable to jump out.

Since the first vehicle 10 as in the second embodiment is not required, the second vehicle 20 may be simply referred to as a "vehicle."

The configuration of the driving support system 40 according to this embodiment will be described below with reference to FIG. 7. Description of elements which are common to those in the second embodiment will be appropriately omitted or simplified.

The driving support system 40 includes an information providing device 42 and a driving support device 43. The driving support system 40 may not include the image uploading device 41 in the second embodiment.

In this embodiment, the information providing device 42 is provided outside the second vehicle 20 such as a data center. As in the second embodiment, the information providing device 42 is constituted by a server 30 which belongs to a cloud computing system or other computing system.

The configuration of the information providing device 42 is the same as in the second embodiment and thus description thereof will not be repeated.

As in the second embodiment, the driving support device 43 is provided in the second vehicle 20.

As in the second embodiment, the second vehicle 20 includes an imaging unit 25, an input unit 26, and an output unit 27 in addition to the driving support device 43.

Figure 8:
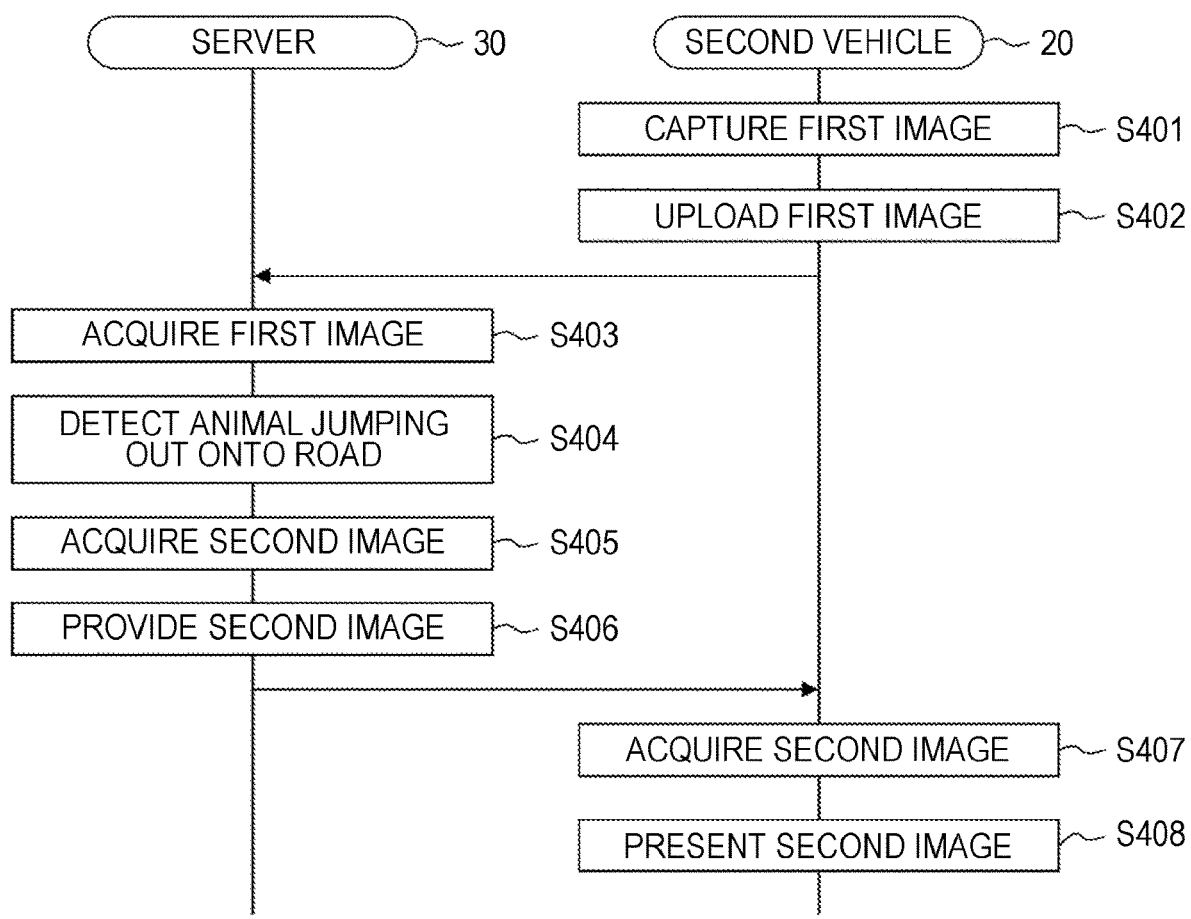
FIG. 8 is a flowchart illustrating a flow of operations of the driving support system according to the fourth embodiment.

The operation of the driving support system 40 according to this embodiment will be described below with reference to FIG. 8 in addition to FIG. 7. Description of elements which are common to those in the second embodiment will be appropriately omitted or simplified. The operation of the driving support system 40 corresponds to a driving support method according to this embodiment.

The processes of Steps S401 and S402 are performed by the second vehicle 20.

The processes of Steps S401 and S402 are the same as the processes of Steps S201 and S202 except that the first vehicle 10 and the control unit 11, the storage unit 12, the communication unit 13, and the positioning unit 14 of the image uploading device 41, and the imaging unit 15 are replaced with the second vehicle 20, the control unit 21, the storage unit 22, the communication unit 23, and the positioning unit 24 of the driving support device 43, and the imaging unit 25, respectively, and thus description thereof will not be repeated.

The processes of Steps S403 to S406 are performed by the server 30.

The processes of Steps S403 to S406 are the same as the processes of Steps S203 to S206 except that the first vehicle 10, the image uploading device 41, and the imaging unit 15 are replaced with the second vehicle 20, the driving support device 43, and the imaging unit 25, and thus description thereof will not be repeated.

The processes of Steps S407 and S408 are performed by the second vehicle 20.

The process of Step S407 is the same as the process of Step S207 and thus description thereof will not be repeated.

In Step S408, the control unit 21 of the driving support device 43 presents the second image 52 acquired by the communication unit 23 to the driver of the second vehicle 20. The control unit 21 uses the output unit 27 as means for presenting the second image 52. That is, the output unit 27 displays the second image 52 acquired by the communication unit 23 to present the second image 52 to the driver of the second vehicle 20 under the control of the control unit 21.

Specifically, the control unit 21 acquires the second image 52, the time information, and the position information received by the communication unit 23 from the communication unit 23. The control unit 21 stores the acquired second image 52 in the storage unit 22 and stores the acquired time information and the acquired position information in the storage unit 22 in correlation with the second image 52. The control unit 21 inputs the second image 52 stored in the storage unit 22 and the time information and the position information which are stored in the storage unit 22 and correspond to the second image 52 to the output unit 27. The output unit 27 displays a screen including the second image 52, the time information, and the position information which are input from the control unit 21. In the screen, the position information may be displayed in characters, and is displayed in the format in which a figure such as an icon is disposed at a corresponding position on a map in this embodiment. A figure such as another icon may be disposed at a current position of the second vehicle 20 on the same map. In this case, the control unit 21 acquires position information of the second vehicle 20 at the current time from the positioning unit 24 as information indicating the current position of the second vehicle 20.

The control unit 21 may present the second image 52 at any time and the second image 52 is presented to the driver of the second vehicle 20 when the second vehicle 20 travels on the road Rx at an opportunity other than the time at which the first image 51 has been captured in this embodiment. Accordingly, the control unit 21 ascertains that a predetermined time elapses from the time at which the first image 51 has been captured by referring to the time information, which is stored in the storage unit 22, corresponding to the second image 52. Then, the control unit 21 determines whether the second vehicle 20 is currently traveling on the road Rx by comparing the position information acquired from the positioning unit 24 with map information which is stored in advance in the storage unit 22 and indicates the position of the road Rx. The control unit 21 presents the second image 52 to the driver of the second vehicle 20, for example, when the second vehicle 20 reaches a point at which the sign Sx of the road Rx is visible after a day subsequent to the day on which the first image 51 has been captured.

The control unit 21 may present the second image 52 to the driver of the second vehicle 20 before the second vehicle 20 travels on the road Rx at an opportunity other than the time at which the first image 51 has been captured. In this case, the control unit 21 ascertains that a predetermined time elapses from the time at which the first image 51 has been captured by referring to the time information corresponding to the second image 52. Then, the control unit 21 predicts whether the second vehicle 20 will travel on the road Rx in the future by comparing the position information acquired from the positioning unit 24 with the map information. Alternatively, when a traveling route of the second vehicle 20 is set by a navigation function, the control unit 21 predicts whether the second vehicle 20 will travel on the road Rx in the future by determining whether the road Rx is included in the set traveling route.

When an animal jumping out onto the road Rx appears in the first image 51 but it is estimated that a driver of the first vehicle 10 does not visually recognize the animal jumping out such as when the first image 51 is an image in rear of the first vehicle 10, the control unit 21 may present the second image 52 to the driver of the second vehicle 20 at the same opportunity as capturing the first image 51.

As described above, in this embodiment, the process of analyzing an image is performed by the server 30 outside the second vehicle 20. Accordingly, according to this embodiment, it is possible to simplify the configuration of the second vehicle 20

As in the first embodiment, an object to be detected has only to be an object that is liable to enter a road, is not limited to an animal, and may be an object such as falling stones or a person such as a child or an old person.

Fifth Embodiment

The outline of this embodiment will be described below with reference to FIG. 9.

As in the second embodiment, the imaging unit 15 of the first vehicle 10 captures a first image 51 from the first vehicle 10. The control unit 31 of the server 30 detects an animal jumping out onto a road from the first image 51 captured by the imaging unit 15 of the first vehicle 10.

In the second embodiment, the output unit 27 of the second vehicle 20 displays a second image 52 including the animal detected by the control unit 31 of the server 30 to present the second image 52 to the driver of the second vehicle 20. On the other hand, in this embodiment, the output unit 27 of the second vehicle 20 displays a statistic 53 of a result of detection from the control unit 31 of the server 30 to present the statistic 53 to the driver of the second vehicle 20.

The driver of the second vehicle 20 can recognize what animal has actually jumped onto the road at what proportion by watching the statistic 53 displayed on the output unit 27. Accordingly, according to this embodiment, the driver of the second vehicle 20 can obtain a real feeling that an animal is liable to jump out onto the road onto which an animal is liable to jump out.

The number of first vehicles 10 is preferably one or more, and accuracy of the statistic 53 becomes higher as the number of first vehicles 10 becomes larger.

Since the second image 52 as in the second embodiment is not required, the first image 51 may be simply referred to as an "image."

The configuration of the driving support system 40 according to this embodiment is the same as in the second embodiment and thus description thereof will not be repeated.

The operation of the driving support system 40 according to this embodiment will be described below with reference to FIG. 10 in addition to FIG. 9. Description of elements which are common to those in the second embodiment will be appropriately omitted or simplified. The operation of the driving support system 40 corresponds to a driving support method according to this embodiment.

The processes of Steps S501 and S502 are performed by the first vehicle 10.

The processes of Steps S501 and S502 are the same as the processes of Steps S201 and S202 and thus description thereof will not be repeated.

The processes of Steps S503 to S506 are performed by the server 30.

The processes of Steps S503 and S504 are the same as the processes of Steps S203 and S204 and thus description thereof will not be repeated.

Instead of causing the server 30 to perform the process of Step S504, the same process as Step S102 may be performed by the first vehicle 10 and the acquired result of detection may be transmitted from the first vehicle 10 to the server 30.

In Step S505, the control unit 31 acquires a statistic 53 as the result of detection in Step S504.

Specifically, when an animal appears in the first image 51 which is analyzed in Step S502 and it is determined that the animal enters the road Rx, the control unit 31 updates a count value stored in the storage unit 32. This count value is a value obtained by counting the number of times of an animal entering the road Rx in a recent unit period such as a week or a month. The control unit 31 stores the updated count value as the statistic 53 in the storage unit 32.

When an animal jumping out onto the road Rx appears in a series of frames of a moving image captured as the first image 51, the control unit 31 increases the count value for the series of frames by 1 instead of increasing the count value for each frame by 1. Alternatively, when an animal jumping out onto the road Rx appears in a series of still images captured as the first image 51, the control unit 11 increases the count value for the series of still images by 1 instead of increasing the count value for each still image by 1.

The control unit 11 may calculate an average value of the updated count value and a value obtained by counting the number of times of an animal entering the road Rx in one or more unit periods in the past and store the result of calculation as the statistic 53 in the storage unit 32. Alternatively, the control unit 11 selects a representative value such as a maximum value, a minimum value, a median value, or a mode value out the update count value and the value obtained by counting the number of times of an animal entering the road Rx in one or more unit periods in the past and store the selected representative value as the statistic 53 in the storage unit 32.

When it is determined that an animal does not appear in the first image 51 or it is determined that an animal appears but the animal does not enter the road Rx, the control unit 11 does not update the count value stored in the storage unit 32.

In Step S506, the communication unit 33 of the information providing device 42 provides the statistic 53 acquired by the control unit 31 to present the statistic 53 to the driver of the second vehicle 20 under the control of the control unit 31.

Specifically, the control unit 31 inputs the statistic 53 stored in the storage unit 32 and the position information of the road Rx to the communication unit 33. The communication unit 33 transmits the statistic 53 and the position information which are input from the control unit 31 to the driving support device 43 of the second vehicle 20 by the network 44.

The processes of Steps S507 and S508 are performed by the second vehicle 20.

In Step S507, the communication unit 23 of the driving support device 43 acquires the statistic 53 which is provided from the information providing device 42 which is the server 30.

Specifically, the communication unit 23 receives the statistic 53 and the position information which are transmitted from the information providing device 42 which is the server 30 via the network 44.

In Step S508, the control unit 21 of the driving support device 43 presents the statistic 53 acquired by the communication unit 23 to the driver of the second vehicle 20. The control unit 21 uses the output unit 27 as means for presenting the statistic 53. That is, the output unit 27 displays the statistic 53 acquired by the communication unit 23 to present the statistic 53 to the driver of the second vehicle 20 under the control of the control unit 21.

Specifically, the control unit 21 acquires the statistic 53 and the position information received by the communication unit 23 from the communication unit 23. The control unit 21 stores the acquired statistic 53 in the storage unit 22 and stores the acquired position information in the storage unit 22 in correlation with the statistic 53. The control unit 21 inputs the statistic 53 stored in the storage unit 22 and the position information which is stored in the storage unit 22 and corresponds to the statistic 53 to the output unit 27. The output unit 27 displays a screen including the statistic 53 and the position information which are input from the control unit 21. In the screen, the position information may be displayed in characters, and is displayed in the format in which a figure such as an icon is disposed at a corresponding position on a map in this embodiment. A figure such as another icon may be disposed at a current position of the second vehicle 20 on the same map. In this case, the control unit 21 acquires position information of the second vehicle 20 at the current time from the positioning unit 24 as information indicating the current position of the second vehicle 20.

The output unit 27 may output the statistic 53 by speech instead of displaying the statistic 53.

The control unit 21 may present the statistic 53 at any time, and the statistic 53 is presented to the driver of the second vehicle 20 when the second vehicle 20 travels on the road Rx in this embodiment. Accordingly, the control unit 21 determines whether the second vehicle 20 is currently traveling on the road Rx by comparing the position information acquired from the positioning unit 24 with map information which is stored in advance in the storage unit 22 and indicates the position of the road Rx. The control unit 21 presents the statistic 53 to the driver of the second vehicle 20, for example, when the second vehicle 20 reaches a point at which the sign Sx of the road Rx is visible.

The control unit 21 may present the statistic 53 to the driver of the second vehicle 20 before the second vehicle 20 travels on the road Rx. In this case, the control unit 21 predicts whether the second vehicle 20 will travel on the road Rx in the future by comparing the position information acquired from the positioning unit 24 with the map information. Alternatively, when a traveling route of the second vehicle 20 is set by a navigation function, the control unit 21 predicts whether the second vehicle 20 will travel on the road Rx in the future by determining whether the road Rx is included in the set traveling route.

As described above, in this embodiment, the control unit 11 of the information providing device 42 detects an animal jumping out onto the road Rx from the first image 51 captured from at least one first vehicle 10 and acquires the statistic 53 of the result of detection. The communication unit 13 of the information providing device 42 provides the statistic 53 to present the statistic 53 to the driver of the second vehicle 20 under the control of the control unit 11. When an animal jumping out onto the road Rx is detected from the first image 51 captured from at least one first vehicle 10, the control unit 21 of the driving support device 43 acquires the statistic 53 of the result of detection and presents the acquired statistic 53 to the driver of the second vehicle 20. Accordingly, according to this embodiment, the driver of the second vehicle 20 can obtain a real feeling that an animal is liable to jump out onto the road Rx. As a result, it is possible to improve a driver's power of attention and to enable safer driving.

An object to be detected has only to be an object that is liable to jump out onto the road, is not limited to an animal, and may be an object such as falling stones or a person such as a child or an old person. In any case, the control unit 11 of the information providing device 42 acquires the statistic 53 of the result of detection. The control unit 21 of the driving support device 43 acquires the statistic 53 of the result of detection and presents the acquired statistic 53 to the driver of the second vehicle 20. Accordingly, the driver of the second vehicle 20 can obtain a real feeling that an object is liable to enter a road which an object is liable to enter.

In this embodiment, particularly, when a sign Sx indicating that an animal is liable to jump out is installed on a road Rx, the control unit 11 of the information providing device 42 acquires a statistic 53. Particularly, when the sign Sx is installed on the road Rx, the control unit 21 of the driving support device 43 acquires a statistic 53 and presents the acquired statistic 53 to the driver of the second vehicle 20. Accordingly, it is possible to give a driver a real feeling that an animal is liable to jump out, which cannot be obtained by simply seeing the sign Sx.

When an object to be detected includes falling stones and a sign Sy indicating that falling stones are liable is installed on a road Ry, the control unit 11 of the information providing device 42 acquires a statistic 53. When the sign Sy is installed on the road Ry, the control unit 21 of the driving support device 43 acquires the statistic 53 and presents the acquired statistic 53 to the driver of the second vehicle 20. Accordingly, it is possible to give a driver a real feeling that falling stones are liable to occur, which cannot be obtained by simply seeing the sign Sy.

When an object to be detected includes a child and a sign Sz indicating that there is a school, a kindergarten, or a child care center is installed on a road Rz, the control unit 11 of the information providing device 42 acquires a statistic 53. When the sign Sz is installed on the road Rz, the control unit 21 of the driving support device 43 acquires the statistic 53 and presents the acquired statistic 53 to the driver of the second vehicle 20. Accordingly, it is possible to give a driver a real feeling that a child is liable to jump out, which cannot be obtained by simply seeing the sign Sz.

When the second vehicle 20 is in a fully automated driving mode, the control unit 21 of the driving support device 43 may not present the acquired statistic 53 to the driver of the second vehicle 20.

The statistic 53 may be acquired and presented depending on statistic techniques, types of objects such as animals, time periods in which objects enter a road, or other conditions, and an amount of information is appropriately adjusted such that safe driving is not disturbed.

The disclosure is not limited to the above-mentioned embodiments. For example, a plurality of blocks illustrated in the block diagrams may be combined or one block may be divided. A plurality of steps illustrated in the flowcharts may not be performed in a time series in the described sequence, but may be performed in parallel or in other sequences depending on processing capabilities of devices that perform the steps or if necessary. The embodiments can be modified without departing from the gist of the disclosure.

What is claimed is:

1. A driving support device, comprising:
    processing circuitry configured to:
        acquire a first image captured from a vehicle, the first image including a moving image or a still image;
        when an animal entering a road is detected in a series of frames of the moving image, select one or more of the frames of the series of frames as a selected image;
        when the animal entering the road is detected in a series of the still images, select one or more still images of the series of the still images as the selected image;
        perform a processing, including a change in size or a change in resolution, on the selected image;
        store the processed selected image as a second image; and
        present the second image to a driver,
    wherein the processing circuitry is configured to present the second image when an animal road sign indicating that an animal is liable to enter the road is installed on the road.

2. The driving support device according to claim 1, wherein the processing circuitry is configured to present the second image to a driver of a second vehicle when or before the second vehicle travels on the road.

3. The driving support device according to claim 1, wherein the processing circuitry is configured to detect the animal from the first image and to present the second image to a driver of the vehicle when or before the vehicle travels on the road at an opportunity other than a time at which the first image has been captured.

4. A vehicle comprising:
    the driving support device according to claim 1; and
    a display that displays the second image under control of processing circuitry.

5. An information providing device comprising:
    processing circuitry configured to:
        acquire a first image captured from a vehicle, the first image including a moving image or a still image,
        when an animal entering a road is detected in a series of frames of the moving image, select one or more of the frames of the series of frames as a selected image,
        when the animal entering the road is detected in a series of the still images, select one or more still images of the series of the still images as the selected image,
        perform a processing, including a change in size or a change in resolution, on the selected image, and
        store the processed selected image as a second image; and
    a communication interface configured to provide the second image to present the second image to a driver under the control of the processing circuitry,
    wherein the processing circuitry is configured to acquire the second image when an animal road sign indicating that an animal is liable to enter the road is installed on the road.

6. The information providing device according to claim 5, wherein the processing circuitry is configured to acquire an image including falling stones on the road as the second image when a falling stones road sign indicating that falling stones are likely is installed on the road.

7. The information providing device according to claim 5, wherein the processing circuitry is configured to acquire an image including a child jumping out onto the road as the second image when a school, a kindergarten, or a child care center road sign indicating that there is a school, a kindergarten, or a child care center is installed in the road.

8. A vehicle comprising:
    an imaging device configured to capture the first image; and
    the information providing device according to claim 5.

9. A driving support system comprising:
    the information providing device according to claim 5; and
    a driving support device that acquires the second image from the information providing device and presents the second image to the driver.

10. A driving support method comprising:
    causing an imaging device to capture a first image from a vehicle, the first image including a moving image or a still image;
    when an animal entering a road is detected in a series of frames of the moving image, causing processing circuitry to select one or more of the frames of the series of frames as a selected image;
    when the animal entering the road is detected in a series of the still images, causing the processing circuitry to select one or more still images of the series of the still images as the selected image;
    causing the processing circuitry to perform a processing, including a change in size or a change in resolution, on the selected image;
    causing the processing circuitry to store the processed selected image as a second image; and
    causing a display to display the second image to present the second image to a driver including displaying the second image when an animal road sign indicating that an animal is liable to enter the road is installed on the road.

11. A driving support device, comprising:
    processing circuitry configured to:
        acquire an image captured from at least one vehicle, the image including a moving image or a still image;
        when an animal entering a road is detected in a series of frames of the moving image, set, as a detection result, that the animal has entered the road;
        when the animal entering the road is detected in a series of the still images, set, as the detection result, that the animal has entered the road;
        acquire a statistic of the detection result; and
        present the acquired statistic to a driver,
    wherein the processing circuitry is configured to present the statistic when an animal road sign indicating that an animal is liable to enter the road is installed on the road.

12. An information providing device comprising:
    processing circuitry configured to:

acquire an image captured from at least one vehicle, the image including a moving image or a still image, when an animal entering a road is detected in a series of frames of the moving image, set, as a detection result, that the animal has entered the road, when the animal entering the road is detected in a series of the still images, set, as the detection result, that the animal has entered the road, and acquire a statistic of the detection result; and a communication interface configured to provide the statistic to present the statistic to a driver under the control of the processing circuitry, wherein the processing circuitry is configured to acquire the statistic when an animal road sign indicating that an animal is liable to enter the road is installed on the road.

13. A driving support system comprising:

the information providing device according to claim 12; and a driving support device that acquires the statistic from the information providing device and presents the statistic to the driver.

14. A driving support method comprising:

causing an imaging device to capture an image from a vehicle, the image including a moving image or a still image;

when an animal entering a road is detected in a series of frames of the moving image, causing processing circuitry to set, as a detection result, that the animal has entered the road, when the animal entering the road is detected in a series of the still images, causing the processing circuitry to set, as the detection result, that the animal has entered the road;

causing a display to output a statistic of the detection result to present the statistic to a driver including causing the display to output the statistic when an animal road sign indicating that an animal is liable to enter the road is installed on the road.

* * * * *